United States Patent
Lee et al.

(10) Patent No.: US 11,592,702 B2
(45) Date of Patent: Feb. 28, 2023

(54) POLARIZING PLATE AND OPTICAL DISPLAY DEVICE INCLUDING SAME

(71) Applicant: Samsung SDI Co., Ltd., Yongin-si (KR)

(72) Inventors: Jeong Ho Lee, Suwon-si (KR); Dae Gyu Lee, Suwon-si (KR); Yong Un Jung, Suwon-si (KR); Young Oh, Suwon-si (KR); Dong Ho Wee, Suwon-si (KR); Jang Hyun Cho, Suwon-si (KR); Young Hyun Ju, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 141 days.

(21) Appl. No.: 16/611,368

(22) PCT Filed: May 14, 2018

(86) PCT No.: PCT/KR2018/005498
§ 371 (c)(1),
(2) Date: Nov. 6, 2019

(87) PCT Pub. No.: WO2018/212528
PCT Pub. Date: Nov. 22, 2018

(65) Prior Publication Data
US 2020/0159068 A1    May 21, 2020

(30) Foreign Application Priority Data
May 18, 2017    (KR) ......................... 10-2017-0061882

(51) Int. Cl.
*G02F 1/1335*    (2006.01)
*G02B 5/30*    (2006.01)

(52) U.S. Cl.
CPC ....... *G02F 1/133528* (2013.01); *G02B 5/305* (2013.01); *C09K 2323/031* (2020.08)

(58) Field of Classification Search
CPC ......... G02F 1/133528; G02F 1/133545; G02B 5/305; G02B 5/223; C09K 2323/031
See application file for complete search history.

(56) References Cited

U.S. PATENT DOCUMENTS

| | | | |
|---|---|---|---|
| 2005/0088084 A1* | 4/2005 | Cok | .................... H01L 51/5281 313/506 |
| 2006/0007288 A1* | 1/2006 | Takada | .................. C09D 11/54 347/100 |

(Continued)

FOREIGN PATENT DOCUMENTS

| | | | | |
|---|---|---|---|---|
| CN | 110637239 B | * | 5/2022 | ............. G02B 5/223 |
| JP | 2006-251659 A | | 9/2006 | |

(Continued)

OTHER PUBLICATIONS

Chinese Office action from corresponding Chinese Patent Application No. 201880032455.8, Chinese Office action dated Mar. 1, 2021 (9 pgs.).

*Primary Examiner* — Sophie Hon
(74) *Attorney, Agent, or Firm* — Lewis Roca Rothgerber Christie LLP (57) ABSTRACT

Provided are a polarizing plate and an optical display device including same, the polarizing plate comprising a polarizing film and a contrast ratio enhancement layer formed on a light-emitting surface of the polarizing film, wherein the contrast ratio enhancement layer comprises: a first resin layer including a pattern unit having one or more engraved patterns and a flat portion formed between the engraved patterns; and a second resin layer directly formed on the pattern unit, wherein the engraved patterns have a base angle of approximately 75° to approximately 90°, the pattern unit (Continued)

satisfies formula 1, the first resin layer has a refractive index larger than that of the second resin layer, and the first resin layer includes a dye of which the maximum absorption wavelength is approximately 550 nm to approximately 620 nm.

17 Claims, 1 Drawing Sheet

(56) References Cited

U.S. PATENT DOCUMENTS

| | | | | |
|---|---|---|---|---|
| 2014/0175404 A1* | 6/2014 | Shim | ............... | H01L 51/5275 257/40 |
| 2014/0184994 A1* | 7/2014 | Kuroda | ............ | G02B 5/3033 349/96 |
| 2014/0254147 A1* | 9/2014 | Cho | ................ | G02B 5/201 362/231 |
| 2015/0212368 A1* | 7/2015 | Yonemoto | ......... | G02B 5/3025 349/61 |
| 2016/0216420 A1* | 7/2016 | Gaides | ............ | G02B 5/3066 |

FOREIGN PATENT DOCUMENTS

| | | | | |
|---|---|---|---|---|
| KR | 10-2014-0079216 A | 6/2014 | | |
| KR | 10-1659241 B1 | 9/2016 | | |
| KR | 10-2017-0027486 A | 3/2017 | | |
| KR | 10-2017-0032868 A | 3/2017 | | |
| KR | 102063201 B1 * | 1/2020 | ............ | G02B 5/223 |
| TW | 200925218 * | 6/2009 | | |
| TW | 201643483 A | 12/2016 | | |
| WO | WO 2017/007236 A1 | 1/2017 | | |

\* cited by examiner

POLARIZING PLATE AND OPTICAL DISPLAY DEVICE INCLUDING SAME

CROSS-REFERENCE TO RELATED APPLICATIONS

This application is a U.S. National Phase Patent Application of International Application Number PCT/KR2018/005498, filed on May 14, 2018, which claims priority to Korean Patent Application Number 10-2017-0061882, filed on May 18, 2017, the entire contents of both of which are incorporated herein by reference.

TECHNICAL FIELD

The invention relates to a polarizing plate and an optical display device including the same.

BACKGROUND ART

A liquid crystal display device is operated by emitting light from a backlight unit through a liquid crystal panel. Therefore, front contrast ratio (CR) is relatively good in the liquid crystal display device. However, lateral contrast ratio of the liquid crystal display device is relatively low. There has been an attempt to increase the lateral contrast ratio by modifying the structure of the liquid crystal panel or liquid crystals. However, as the lateral contrast ratio increases, the front contrast ratio tends to decrease. Thus, it is necessary to increase the lateral contrast ratio while minimizing reduction of the front contrast ratio.

Reduction of the lateral contrast ratio may be prevented by diffusing concentrated light passing through the liquid crystal panel and the polarizing plate. An optical film including a bead may be employed to diffuse the concentrated light. However, diffusion efficiency or processability may be low in this method.

One example of the background technique is disclosed in Japanese Patent Laid-open Publication No. 2006-251659.

DISCLOSURE

Technical Problem

One aspect of the invention is to provide a polarizing plate which may reduce front brightness in a black mode and enhance front contrast ratio.

Another aspect of the invention is to provide a polarizing plate which may enhance front contrast ratio by relatively increasing brightness degradation in a black mode in comparison to brightness degradation in a white mode.

Another aspect of the invention is to provide a polarizing plate which may lower reflectance.

Another aspect of the invention is to provide a polarizing plate having good appearance while including a dye.

Technical Solution

A polarizing plate according to an embodiment of the invention may include a polarizing film, and a contrast ratio enhancing layer formed on a light exit surface of the polarizing film, wherein the contrast ratio enhancing layer includes a first resin layer and a second resin layer, the first resin layer having a patterned portion including engraved patterns and a flat portion formed between the engraved patterns, the second resin layer being directly formed in contact with the patterned portion, the engraved pattern having a base angle of about 75° to about 90°, the patterned portion satisfying the following Formula 1:

$$1 < P/W \leq 10 \quad \text{[Formula 1]}$$

in Formula 1 above, P and W are as defined in the following detailed description, the first resin layer having a refractive index greater than a refractive index of the second resin layer, the first resin layer including a dye having a maximum absorption wavelength of about 550 nm to about 620 nm.

An optical display device according to an embodiment of the invention may include the polarizing plate according to an embodiment of the invention.

Advantageous Effects

The invention provides a polarizing plate which may reduce front brightness in a black mode and enhance front contrast ratio.

The invention provides a polarizing plate which may enhance front contrast ratio by relatively increasing brightness degradation in a black mode in comparison to brightness degradation in a white mode.

The invention provides a polarizing plate which may lower reflectance.

The invention provides provide a polarizing plate having good appearance while including a dye.

BEST MODE

Exemplary embodiments of the invention are described in detail with reference to the accompanying drawings. It is understood that the invention is not limited to the following embodiments and may be embodied in different ways. In the drawings, portions irrelevant to the description are omitted for clarity. Like components are denoted by like reference numerals throughout the specification.

As used herein, spatially relative terms such as "upper portion" and "lower portion" are defined with reference to the accompanying drawings. Thus, it is understood that the term "upper portion" can be used interchangeably with the term "lower portion". It is understood that when an element such as a layer, film, region or substrate is referred to as being placed "on" another element, it can be placed directly on the other element, or intervening layer(s) may be present. On the other hand, when an element is referred to as being placed "directly on" another element, no intervening layer is present between two elements.

As used herein, the terms "horizontal direction" and "vertical direction" refer to a longitudinal direction and a transverse direction of a screen of a liquid crystal display, respectively. As used herein, the term "lateral" refers to a region in which θ ranges from 60° to 90° in a spherical coordinate system (φ, θ) in which a front is indicated by (0°, 0°), a left end point is indicated by (180°, 90°), and a right end point is indicated by (0°, 90°) with reference to the horizontal direction.

As used herein, the term "top part" refers to a portion located at an uppermost portion with respect to a lowermost portion of an engraved pattern.

As used herein, the term "aspect ratio" refers to a ratio of a maximum height of an engraved pattern to a maximum width of the engraved pattern (maximum height/maximum width).

As used herein, the term "pitch" refers to a distance between adjacent engraved patterns, such as a sum of a width of one engraved pattern and a width of one flat portion.

As used herein, the term "in-plane retardation Re" is a value at a wavelength of 550 nm and is represented by the following Formula A:

$$Re=(nx-ny) \times d \quad \text{[Formula A]}$$

wherein in Formula A above, nx and ny are refractive indices at a wavelength of 550 nm in a slow axis direction and a fast axis direction respectively, and d is a thickness of a corresponding optical device (unit: nm).

As used herein, the term "(meth)acryl" refers to acryl and/or methacryl.

Figure 1:
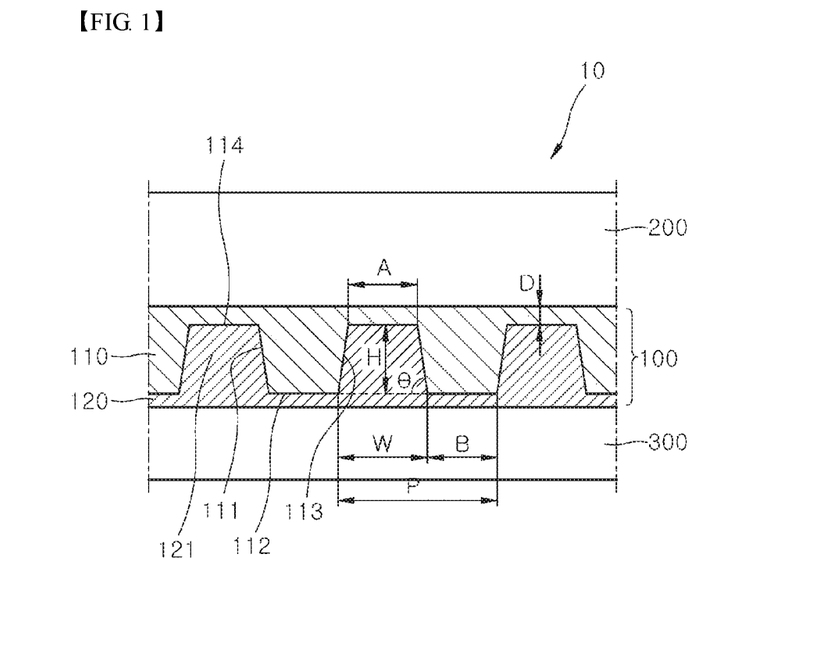
FIG. 1 is a cross-sectional view of a polarizing plate according to an embodiment of the invention.

Hereinafter, a polarizing plate according to an embodiment of the invention will be described with reference to FIG. 1. FIG. 1 is a cross-sectional view of a polarizing plate according to an embodiment of the invention.

Referring to FIG. 1, a polarizing plate 10 may include a contrast ratio enhancing layer 100, a protective layer 200, and a polarizing film 300.

The contrast ratio enhancing layer 100 may be formed on a light exit surface of the polarizing film 300 and may transmit light exiting from the polarizing film 300. The protective film 200 may be formed on the contrast ratio enhancing layer 100 (on a light exit surface of the contrast ratio enhancing layer 100) to support the contrast ratio enhancing layer 100.

The contrast ratio enhancing layer 100 may have a first resin layer 110 and a second resin layer 120 formed on the first resin layer 110, and the first resin layer 110 may include a patterned portion including engraved patterns 111 and a flat portion 112 formed between the engraved patterns.

The patterned portion may satisfy the following Formula 1, and the engraved pattern 111 may have a base angle θ of about 75° to about 90°. The base angle θ of about 75° to about 90° represents that an angle between an inclined surface 113 of the engraved pattern 111 and a maximum width W line of the engraved pattern 111 may be in a range of about 75° to about 90°. As used herein, the inclined surface 113 of the engraved pattern 111 may represent a surface directly connected to the flat portion 112. Within this range of the base angle, a difference between a front contrast ratio and a lateral contrast ratio may be reduced. For example, the base angle θ may be in a range of about 80° to about 90°, and P/W may be in a range of about 1.2 to about 8:

$$1<P/W\leq 10 \quad \text{[Formula 1]}$$

wherein in Formula 1 above, P is a pitch of the patterned portion (unit: μm), and W is a maximum width of the engraved pattern (unit: μm).

FIG. 1 illustrates a case in which both base angles of the engraved pattern are the same. However, an engraved pattern having two different base angles may be included within the scope of the invention as long as the base angles are in the above described range of about 75° to about 90°.

The first resin layer 110 may have a refractive index greater than a refractive index of the second resin layer 120, and the first resin layer 110 may be directly formed in contact with the second resin layer 120. As used herein, the term "directly formed" refers that no arbitrary bonding layer, adhesive layer, and/or another optical layer is formed between the first resin layer 110 and the second resin layer 120. Thus, light exited from the second resin layer 120 may directly transmit to the first resin layer 110. FIG. 1 shows a structure in which the second resin layer 120, the first resin layer 110, and the protective layer 200 are sequentially formed on the light exit surface of the polarizing film 300.

The first resin layer 110 may include a dye having a maximum absorption wavelength of about 550 nm to about 620 nm. Within this range of the maximum absorption wavelength, the dye may absorb a portion of light emitted from the flat portion 112 and/or a portion of light that is totally reflected at the inclined surface 113 of the engraved pattern 111 to lower brightness in a black mode and enhance front contrast ratio. The front contrast ratio may represent a ratio of front brightness in a white mode to front brightness in a black mode. This relative front contrast ratio may be 80% or more. In particular, the dye may absorb light capable of increasing brightness in a black mode, when an engraved optical pattern having a base angle of about 75° to about 90° with respect to polarized light emitted from a polarizing film is employed.

In addition, the dye may absorb a portion of external light incident on the first resin layer to lower reflectance measured on the first resin layer to be about 2.0% or less, for example about 1.8% or less. As a result, it is possible to improve screen quality which is affected by external light reflection and to avoid use of an antireflection film. Thus, a thin polarizing plate may be obtained. In this embodiment, the first resin layer which has a high refractive index such as at least about 1.50, specifically about 1.50 to about 1.70 and includes the dye and the above described patterned portion may have reflectance of about 2.0% or less, for example of about 1.8% or less. In particular, the dye may lower reflectance of the first resin layer having a high refractive index of about 1.50 or more to be about 2.0% or less, with respect to the polarizing plate.

In some embodiments, the dye may have a maximum absorption wavelength of about 590 nm to about 610 nm. Within this range, brightness degradation in a white mode may be minimized and front contrast ratio may be further enhanced.

The term "maximum absorption wavelength" refers to a wavelength in which the dye represents a maximum absorption peak, in other words, a wavelength which shows a maximum absorbance value in an absorbance curve. The maximum absorption wavelength may be measured by a method known to those skilled in the art.

In some embodiments, the dye may be disposed between an engraved pattern 111 and an adjacent engraved pattern 111 in the first resin layer 110. For this purpose, the first resin layer 110 may have a wall thickness D of about 10 μm or less, for example about 5 μm or less, specifically about 0 μm, so that the dye is substantially disposed between an engraved pattern 111 and an adjacent engraved pattern 111. As used herein, the term "wall thickness" refers to a minimum distance between a first surface 114 of the engraved pattern and the protective layer 200.

If a film or layer including the dye is formed on a light incident surface of the polarizing film 300, appearance of the polarizing plate may not be good.

In exemplary embodiment, the dye may have light transmittance of about 30% or less, for example about 10% to about 30%, at a wavelength of about 590 nm to about 620 nm. Within this range, front contract ratio may be enhanced while lateral contrast ratio may not be affected. In exemplary embodiment, the dye may have light transmittance of about 80% or more, for example about 80% to about 95%, at a wavelength of about 400 nm to about 500 nm and a wavelength of about 650 nm to about 800 nm. Within this range, relative brightness may be enhanced.

Figure 2:
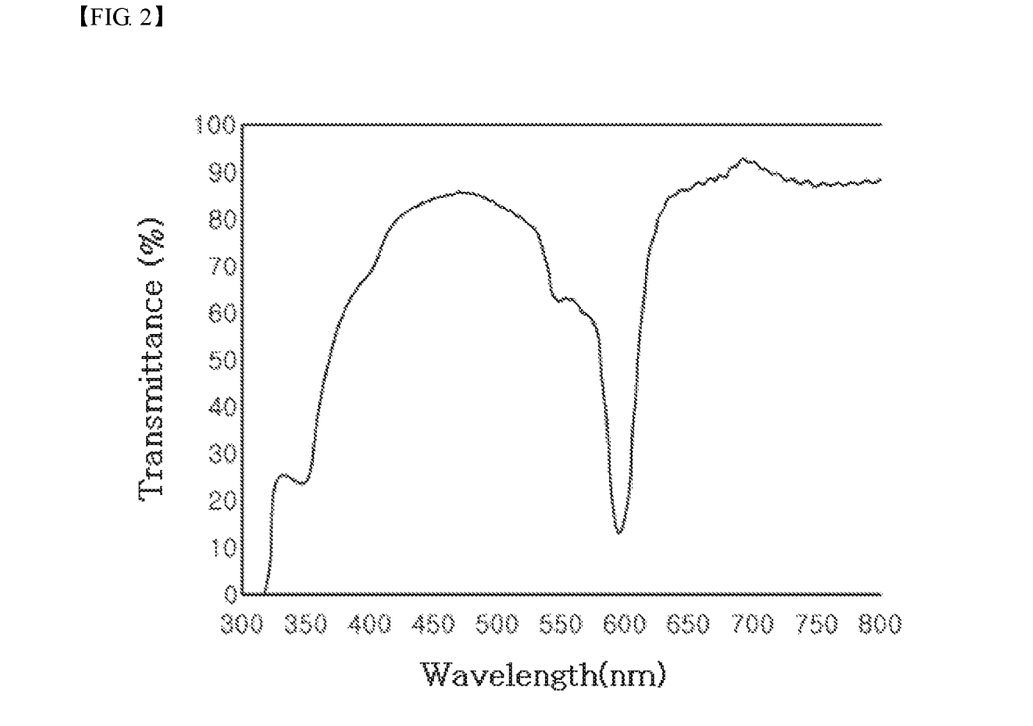
FIG. 2 shows light transmittance of a dye according to an embodiment of the invention depending on a wavelength.

FIG. 2 shows light transmittance of a dye of a first resin layer according to an embodiment of the invention depending on a wavelength. Referring to FIG. 2, the transmittance of the dye decreases as the wavelength increases between about 500 nm to about 550 nm, and the transmittance of the dye increases as the wavelength increases around about 620 nm. Through this, both relative brightness and front contrast ratio may improve.

As used herein, "light transmittance" may be measured after coating a composition prepared by mixing a (meth) acrylic resin having a refractive index of about 1.57 (e.g. SSC-5710, Shina T&C) with 0.4 wt % of a corresponding dye onto a polyethylene terephthalate (PET) film (thickness: 80 μm, TA044, Toyobo Co., Ltd.) to a thickness of about 20 μm, followed by UV curing, and transmitting light from the PET film to a direction of a coating layer.

The dye may be an organic dye and include a porphyrin-based dye. In exemplary embodiment, the porphyrin dye may include a tetraazaporphyrin-based dye. In exemplary embodiment, the porphyrin-based dye may include at least one of a copper-containing or a copper-non-containing dye. Through this, the dye may absorb light at a certain wavelength only.

The dye may be present in the first resin layer in an amount of about 0.05 wt % to about 0.5 wt %, specifically about 0.1 wt % to about 0.3 wt %, more specifically about 0.1 wt % to about 0.2 wt %. Within this range, front contrast ratio may be enhanced and reflectance may be reduced, while a difference between lateral contrast ratio and front contrast ratio being reduced.

The dye may be present in a liquid form, without being limited thereto.

A difference between a refractive index of the first resin layer 110 and a refractive index of the second resin layer 120 may be about 0.20 or less, specifically about 0.10 to about 0.20, more specifically about 0.10 to about 0.15. Within this range, diffusion of collected light and contrast ratio may be enhanced. Specifically, in an optical display device having a refractive index difference of about 0.10 to about 0.15, diffusion of polarized light may be good, and brightness may be enhanced under a same viewing angle.

The first resin layer 110 may have a refractive index of about 1.50 or more, for example about 1.50 to about 1.70. Within this range, light diffusing effect may be excellent. The first resin layer 110 may be formed of a UV curable composition or a heat curable composition including the dye and the (meth)acrylic resin, without being limited thereto.

The engraved pattern 111 may be an engraved optical pattern including the first surface 114 formed on a top part and at least one inclined surface 113 connected to the first surface 114. The engraved pattern 111 may include the inclined surface 113 directly connected to the flat portion 112 of the engraved pattern 111.

The first surface 114 may be formed on the top part and may diffuse light which arrived at the second resin layer 120 of the optical display device to enhance a viewing angel and brightness. FIG. 1 illustrates a case in which the first surface 114 is flat and is formed in parallel with the flat portion 112. However, the first surface 114 may have a small concavo-convex or be a curved surface. When the first surface is a curved surface, a lenticular lens pattern may be formed. The first surface 114 may have a width A of about 0.5 μm to about 30 μm, specifically about 2 μm to about 20 μm.

Referring to FIG. 1, the engraved pattern 111 has a trapezoidal cross-sectional shape in which one flat surface is formed at the uppermost surface thereof and an inclined surface is a flat surface (for example: a truncated prism pattern having a truncated triangular cross-section, that is, a truncated prism shape). Alternatively, in some embodiments, the engraved pattern 111 may have a shape in which a first surface is formed at the uppermost surface thereof and an inclined surface is a curved surface (for example: a truncated lenticular lens pattern or a truncated micro-lens pattern).

The engraved pattern 111 may have an aspect ratio of about 0.3 to about 3.0, specifically about 0.4 to about 2.5, more specifically about 0.4 to about 1.5. Within this range, lateral contrast ratio and viewing angle of an optical display device may improve. The engraved pattern 111 may have a maximum height H of about 40 μm or less, specifically about 30 μm or less, more specifically about 5 μm to about 15 μm. Within this range, contrast ratio, viewing angle and brightness may be enhanced while a Moire phenomenon is suppressed. The engraved pattern 111 may have a maximum width W of about 80 μm or less, specifically about 50 μm or less, more specifically about 5 μm to about 20 μm, or about 10 μm to about 30 μm. Within this range, contrast ratio, viewing angle and brightness may be enhanced while a Moire phenomenon is suppressed.

The flat portion 112 may exit light which arrives at the flat portion 112 and may diffuse light to maintain front contrast ratio and brightness. A ratio WB of the maximum width W of the engraved pattern 111 to the width B of the flat portion 112 may be about 9 or less, specifically about 0.1 to about 5, more specifically about 0.15 to about 3. Within this range, front relative brightness may be enhanced, and a difference between front contrast ratio and lateral contrast ratio may be reduced, while contrast ratio under the same lateral viewing angle and the same front viewing angle being enhanced and a Moire phenomenon being suppressed. The width of the flat portion 112 may be about 1 μm to about 300 μm, specifically about 3 μm to about 50 μm. Within this range, front brightness may be enhanced.

The pitch P may be in a range of about 5 μm to about 500 μm, specifically about 10 μm to about 50 μm. Within this range, brightness and contrast ratio may be enhanced while a Moire phenomenon being suppressed.

The second resin layer 120 may diffuse light by refracting and exiting the light incident from the polarizing film 300 in various directions depending on an incident position.

The second resin layer 120 may include a surface facing the first resin layer 110, and at least one filling pattern 121. The filling pattern 121 may fill at least a portion of the engraved pattern 111. As used herein, the term "fill at least a portion" includes both a structure in which the filling pattern completely fills the engraved pattern 111 and a structure in which the filling pattern partially fills the engraved pattern 111. In the structure in which the filling pattern partially fills the engraved pattern 111, a remaining or unfilled portion of the engraved pattern may be filled with air or a resin having a predetermined refractive index. Specifically, the resin may have a refractive index which is the same as or higher than that of the second resin layer and is the same as or lower than that of the first resin layer.

Although not shown in FIG. 1, the filling pattern and the engraved pattern may be formed in a stripe shape extended in the longitudinal direction and having the above cross section. Alternatively, the filling pattern and the engraved pattern may be formed in a dot shape. As used herein, the term "dot" means that combinations of the filling pattern and the engraved pattern are dispersed. In some embodiment, the filling pattern and the engraved pattern may be formed in an extended form of the stripe shape.

The second resin layer 120 may have a refractive index of less than about 1.52, specifically at least about 1.35 and less than about 1.50. Within this range, the second resin layer 120 may provide high light diffusion and may be easily prepared. The second resin layer 120 may be formed of a composition including a UV curable or heat curable resin including a transparent resin. For example, the resin may include at least one of a (meth)acrylic resin, a polycarbonate-based resin, a silicone-based resin, and an epoxy-based resin, without being limited thereto. The transparent resin may have light transmittance of about 90% or more as measured after being cured.

The second resin layer 120 may be non-adhesive but may have a self-adhesive property to facilitate bonding between layers or to avoid use of a bonding/adhesive layer between layers to make a thin polarizing plate. The self-adhesive resin may include at least one of an acrylic resin, an epoxy resin, and a urethane resin. In exemplary embodiment, the second resin layer may be formed of a heat curable adhesive composition that includes the self-adhesive resin and optionally further includes at least one of a curing agent, a silane coupling agent, and an additive. A curing agent, a silane coupling agent, and an additive known in the art may be used.

The second resin layer 120 does not include the dye (a non-dye-based resin layer). When the second resin layer 120 include the dye, contrast ratio may not improve in comparison to adding the dye to the first resin layer 110.

Although not shown in FIG. 1, at least one of the first resin layer and the second resin layer may further include a light diffusing agent. The light diffusing agent may further enhance diffusion of an optical film. The light diffusing agent may include at least one of an organic light diffuser, an inorganic light diffuser, an organic-inorganic hybrid light diffuser known to those skilled in the art.

The contrast ratio enhancing layer 100 may have a thickness of about 10 μm to about 100 μm, specifically about 20 μm to about 60 μm, more specifically about 20 μm to about 45 μm. Within this range, the contrast ratio enhancing layer 100 may be sufficiently supported by a base film and may be used in an optical display device.

The contrast ratio enhancing layer 100 may have light transmittance of about 10% to about 30% at a wavelength of about 590 nm to about 610 nm, and light transmittance of about 80% to about 95% at a wavelength of about 400 nm to about 500 nm and a wavelength of about 650 nm to about 800 nm. Within this range, brightness in a black mode will be reduced to enhance contrast ratio and brightness.

The protective layer 200 may be directly formed on the contrast ratio enhancing layer 100. The term "directly formed" refers that no arbitrary optical layer, bonding layer, or adhesive layer is formed between the contrast ratio enhancing layer and the protective layer.

The protective layer 200 and the contrast ratio enhancing layer 100 may be integrated. The term "integrate" means that the protective layer and the contrast ratio enhancing layer are not independently separated from each other.

FIG. 1 shows a case in which the protective layer 200 is formed. However, the protective layer 200 may be omitted. The protective layer 200 may be referred to as a first protective layer for convenience.

The protective layer may be a retardation film having a predetermined range of retardation or an isotropic optical film. In exemplary embodiment, the protective layer may have an in-plane retardation Re of about 8,000 nm or more, specifically about 10,000 nm or more, more specifically more than about 10,000 nm, more specifically about 10,100 nm to about 15,000 nm. Within this range, rainbow spots may become invisible, and light diffused through the contrast ratio enhancing layer may further be diffused. In another embodiment, the base film may be an isotropic optical film having an in-plane retardation Re of about 60 nm or less, specifically about 0 nm to about 60 nm, more specifically about 40 nm to about 60 nm. Within this range, a viewing angle may be compensated to improve image quality. The term "isotropic optical film" means a film having substantially the same nx, ny, and nz, and the term "substantially the same" includes a completely identical case as well as a case having some error.

In exemplary embodiment, the protective layer may include a uniaxially or biaxially stretched film of an optically transparent resin. Specifically, the resin may include at least one of polyester including polyethylene terephthalate (PET), polybutylene terephthalate, polyethylene naphthalate, polybutylene naphthalate, and the like, cellulose ester including acryl, cyclic olefin polymer (COP), triacetyl cellulose (TAC), and the like, polyvinyl acetate, polyvinyl chloride (PVC), polynorbornene, polycarbonate (PC), polyamide, polyacetal, polyphenylene ether, polyphenylene sulfide, polysulfone, polyether sulfone, polyarylate, and polyimide. The protective layer may include a modified film of the above-mentioned resin. Such modification may include copolymerization, branching, cross-linking, or modification of a molecular terminal, and the like.

In exemplary embodiment, the protective layer may include a base film and a primer film formed on at least one surface of the base film. The base film may support the protective layer and have a refractive index ratio in a predetermined range with respect to the primer film to enhance transmittance of the protective layer. Specifically, a ratio of a refractive index of the primer film to a refractive index of the base film (refractive index of the primer film/refractive index of the base film) is about 1.0 or less, specifically about 0.6 to about 1.0, more specifically about 0.69 to about 0.95, more specifically about 0.7 to about 0.9, more specifically from about 0.72 to about 0.88. Within this range, transmittance of the protective layer may increase. The base film may have a refractive index of about 1.3 to about 1.7, specifically about 1.4 to about 1.6. Within this range, the film may be used as the base film of the protective layer, and it is easy to control the refractive index together with the primer film to enhance transmittance of the protective layer. The base film may include a film formed of the resin described above. The primer film may enhance adhesion between the base film and the polarizer. The primer film may have a refractive index of about 1.0 to about 1.6, specifically about 1.1 to about 1.6, more specifically about 1.1 to about 1.5. Within this range, the primer film may be used as an optical film and have an appropriate refractive index with respect to the base film to increase transmittance of the protective layer. The primer film may have a thickness of about 1 nm to about 200 nm, specifically about 60 nm to about 200 nm. Within this range, the primer film may be used as an optical film and have an appropriate refractive index with respect to the base film to increase transmittance of the protective layer while reducing a brittle phenomenon. The primer film may be a non-urethane-based primer film which does not include a urethane group. Specifically, the primer film may be formed of a composition for a primer film including a monomer or a resin such as polyester, acryl, and the like. The above mentioned refractive index may be provided by controlling a mixing ratio (e.g., molar ratio) of these monomers. The composition for the primer film may further include at least one additive such as a UV absorber, an antistatic agent, a defoaming agent, a surfactant, and the like.

The protective layer may have a thickness of about 30 μm to about 120 μm, specifically about 55 μm to about 105 μm. Within this range, the protective layer may be used in an optical display device. The protective layer may have light transmittance of about 80% or more, specifically about 85% to about 95%, in a visible light region. Within this range, the protective layer may be used in an optical display device.

A stacked structure of the contrast ratio enhancing layer 100 and the protective layer 200 may have light transmittance of about 10% to about 30% at a wavelength of about 590 nm to about 610 nm, and light transmittance of about 80% to about 95% at a wavelength of about 400 nm to about 500 nm and at a wavelength of about 650 nm to about 800 nm. Within this range, brightness in a black mode will be reduced and contrast ratio and brightness may improve.

The stacked structure of the contrast ratio enhancing layer 100 and the protective layer 200 may have a thickness of about 50 μm to about 200 μm. Within this range, the stacked structure may diffuse light.

Although not shown in FIG. 1, a functional layer may be formed on another surface of the protective layer 200 (i.e., a surface facing the first resin layer). The functional layer may be formed in a layer independent from the protective layer or may be integrally formed with the protective layer. The functional layer may provide at least one of anti-reflection, low reflection, hard coating, anti-glare, anti-fingerprint, anti-contamination, diffusion, and refraction functions to the first protective layer.

Although not shown in FIG. 1, the polarizing film 300 may be adhered to a light exit surface of a liquid crystal panel to polarize and transmit the light from the liquid crystal panel.

The polarizing film 300 may include a polarizer. The polarizer may polarize incident light, and a conventional polarizer known to those skilled in the art may be used. Specifically, the polarizer may include a polyvinyl alcohol polarizer produced by uniaxially stretching a polyvinyl alcohol film, or a polyene polarizer produced by dehydrating a polyvinyl alcohol film. The polarizer may have a thickness of about 5 μm to about 40 μm. Within this range, the polarizer may be used in an optical display device.

A polarizer alone may be used as the polarizing film 300, or a protective layer may be formed on at least one surface of the polarizer. The protective layer may provide an additional optical function to the polarizing film or may increase mechanical strength of the polarizing film. For convenience, a protective layer formed on a light exit surface of the polarizer is referred to as a second protective layer, and a protective layer formed on a light incident surface of the polarizer is referred to as a third protective layer.

The protective layer may protect and support the polarizer.

In one embodiment, the protective layer may have the same shape with the first protective layer.

In another embodiment, the protective layer may be a protective coating layer. The protective coating layer may improve adhesion to the polarizer, transparency, mechanical strength, thermal stability, moisture barrier properties, and durability. In exemplary embodiment, the protective coating layer may be formed of an active energy ray-curable resin composition including an active energy ray-curable compound and a polymerization initiator. The active energy ray-curable compound may include at least one of a cationic polymerizable curable compound, a radically polymerizable curable compound, a urethane resin, and a silicone resin. The cationic polymerizable curable compound may be an epoxy compound having at least one epoxy group in the molecule, or an oxetane compound having at least one oxetane ring in the molecule. The radically polymerizable curable compound may be a (meth) acrylic compound having at least one (meth) acryloyloxy group in the molecule. The epoxy compound may be at least one of a hydrogenated epoxy compound, a chained aliphatic epoxy compound, a cyclic aliphatic epoxy compound, and an aromatic epoxy compound. The radically polymerizable curable compound may provide a protective coating layer having excellent hardness, mechanical strength, and durability. The radically polymerizable curable compound may be obtained by reacting two or more kinds of a (meth) acrylate monomer having at least one (meth)acryloyloxy group in the molecule and a compound having a functional group, and a (meth)acrylate oligomer having at least two (meth)acryloyloxy groups may be mentioned as an example. Examples of the (meth)acrylate monomer may include a monofunctional (meth)acrylate monomer having one (meth) acryloyloxy group in the molecule, a difunctional (meth) acrylate monomer having two (meth)acryloyloxy groups in the molecule, and a multifunctional (meth)acrylate monomer having three or more (meth)acryloyloxy groups in the molecule. Examples of the (meth)acrylate oligomer may include a urethane (meth)acrylate oligomer, a polyester (meth)acrylate oligomer, an epoxy (meth)acrylate oligomer, and the like. The polymerization initiator may cure the active energy ray-curable compound. The polymerization initiator may include at least one of a photo cationic initiator and a photosensitizer. A polymerization initiator known to those skilled in the art may be used.

In another embodiment, the protective layer may include a liquid crystal film or a liquid crystal coating layer.

The protective layer may have a thickness of about 30 μm to about 120 μm, specifically about 55 μm to about 105 μm. Within this range, the protective layer may be used in an optical display device. The protective layer may have light transmittance of about 80% or more, specifically about 85% to about 95%, in a visible light region. Within this range, the protective layer may be used in an optical display device.

The protective layer may be directly formed on the polarizer or may be bonded by a bonding layer. The bonding layer may be formed of at least one of an aqueous bonding agent, a heat curable bonding agent, a photo curable bonding agent, and a pressure-sensitive bonding agent.

The polarizing plate 10 may have a thickness of about 150 μm to about 400 μm. Within this range, the polarizing plate 10 may be used in an optical display device The polarizing plate 10 may have light transmittance of about 10% to about 30% at a wavelength of about 590 nm to about 610 nm, and light transmittance of about 80% to about 95% at a wavelength of about 400 nm to about 500 nm and at a wavelength of about 650 nm to about 800 nm. Within this range, brightness in a black mode may be reduced and contrast ratio and brightness may improve.

A polarizing plate according to another embodiment of the invention is substantially the same as the polarizing plate according to the embodiment of the invention, except that a bonding/adhesive layer is further formed on a lower surface of the polarizing film, i.e., a light incident surface.

The bonding/adhesive layer may be formed on the lower surface of the polarizing film so that the polarizing plate may be adhered to an optical element (e.g., liquid crystal panel) and the like. The bonding/adhesive layer may include an adhesive layer alone, a bonding layer alone, or a structure in which a bonding layer and an adhesive layer are stacked. The bonding/adhesive layer may be formed of a conventional bonding agent known to those skilled in the art. For example, the bonding layer may include a heat curable bonding agent or a photo curable bonding agent. Specifically, the bonding layer may include a (meth)acryl-based compound, an epoxy-based compound, a cyanoacrylate-based compound, an isocyanate-based compound, and the like. The adhesive layer may be a pressure-sensitive adhesive and may include a (meth)acryl-based adhesive resin, an epoxy resin, a urethane resin, and the like.

An optical display device according to an embodiment of the invention may include the polarizing plate according to an embodiment of the invention. The optical display device may include a liquid crystal display device, and a backlight unit, a light source side polarizing plate, a liquid crystal panel, and a viewer side polarizing plate may be sequentially stacked. The viewer side polarizing plate may include the polarizing plate according to an embodiment of the invention. The liquid crystal panel may employ a vertical alignment (VA) mode, an IPS mode, a patterned vertical alignment (PVA) mode, or a super-patterned vertical alignment (S-PVA) mode, without being limited thereto. The viewer side polarizing plate may be disposed and formed on a light exit surface of the liquid crystal panel to improve contrast ratio and reduce reflectance. The light source side polarizing plate may be disposed between the backlight unit and the liquid crystal panel and may be disposed on the light incident surface of the liquid crystal panel. A polarizing plate known to those skilled in the art may be used.

Hereinafter, the invention will be described in more detail with reference to some examples. It should be understood that these examples are provided for illustration only and are not to be construed in any way as limiting the invention.

EXAMPLE

Example 1

A composition for a first resin layer including a UV curable resin (SSC-5760, Shina T&C) and a dye NEC-594 (Ukseung Chemical Co., Ltd.) was prepared.

The composition for a first resin layer was coated onto one surface of a PET film (Toyobo Co., Ltd., thickness: 80 μm, Re=14,000 nm at a wavelength of 550 nm) as a first protective layer. Using a film having a patterned portion including an embossed pattern having two same base angles and a flat portion formed between the embossed patterns, an engraved pattern and a flat portion were formed on the coating layer, followed by curing to prepare a first resin layer including a patterned portion having an engraved pattern (a trapezoidal engraved pattern having a cross-section shown in FIG. 1) with two same base angles as shown in Table 1 below and a flat portion.

As a second resin layer, an acryl-based adhesive agent (PL-8540, Saiden Chemical Industry Co., Ltd.) was coated onto the first resin layer to prepare a contrast ratio enhancing layer. The second resin layer in the contrast ratio enhancing layer had a filling pattern completely filling the engraved pattern of the first resin layer.

A polarizer was prepared by stretching a polyvinyl alcohol film at 60° C. to 3 times an initial length thereof and adsorbing iodine to the stretched film, followed by stretching the resulting film to 2.5 times the stretched length of the film in an aqueous solution of boric acid at 40° C.

A bonding agent for a polarizing plate (Z-200, Nippon Goshei Co., Ltd.) was coated onto both surfaces of the polarizer, followed by bonding with a PET film (Toyobo Co., Ltd., thickness: 80 μm) as a second protective film and bonding with a COP film (ZEON Corporation) as a third protective film to prepare a polarizing film.

A polarizing plate was prepared by adhering the second resin layer of the contrast ratio enhancing layer to the second protective film of the polarizing film as prepared above (the second resin layer has an adhesive property and additional adhesive agent was not used), in which a COP film, a bonding layer, a polarizer, a bonding layer, a PET film, a second resin layer, a first resin layer, a PET film are sequentially formed. The second resin layer is directed adhered to the PET film.

Examples 2 to 4

Each of the polarizing plates of Examples 2 to 4 was prepared in the same manner as in Example 1, except that a dye as listed in Table 2 was used instead of the dye NEC-594 (Ukseung Chemical Co., Ltd.) and the content of the dye was changed as listed in Table 3.

Comparative Example 1

A polarizing plate of Comparative Example 1 was prepared in the same manner as in Example 1, except that a dye NEC-594 (Ukseung Chemical Co., Ltd) was not included in the composition for the first resin layer.

Comparative Example 2

A polarizing plate of Comparative Example 2 was prepared in the same manner as in Example 1, except that 0.2 wt % of a black pigment CIM400 (Sakata INX Corporation) was used instead of the dye NEC-594 (Ukseung Chemical Co., Ltd) in the composition for the first resin layer. The black pigment CIM400 does not have a maximum absorption of 590 nm as compared to NEC-594 and NEC-597 of Table 2, and the black pigment CIM400 absorbs light in a similar absorption level in all visible light wavelength ranges.

Reference Example 1

A polarizing plate of Reference Example 1 was prepared in the same manner as in Example 1, except that a contrast ratio enhancing layer was not used.

Reference Example 2

A polarizing plate of Reference Example 2 was prepared in the same manner as in Example 1, except the content of the dye NEC-594 (Ukseung Chemical Co., Ltd) was changed as shown in Table 3.

Reference Example 3

A polarizing plate of Reference Example 3 was prepared in the same manner as in Example 1, except the content of the dye NEC-594 (Ukseung Chemical Co., Ltd) was changed as shown in Table 3.

TABLE 1

| Shape of the engraved pattern | Width of a first surface (flat surface) of the engraved pattern | Maximum width of the engraved pattern (μm) | Height of the engraved pattern (μm) | Base angle of the engraved pattern (°) | Width of a flat portion (μm) | Pitch (μm) | Thickness of a wall (μm) |
|---|---|---|---|---|---|---|---|
| Truncated-prism | 5.8 | 7 | 7 | 85 | 7 | 14 | 5 |

FIG. 2 is a graph showing transmittance of light depending on a wavelength as measured by coating a composition obtained by mixing a (meth)acrylic resin having a refractive index of 1.57 (product name: SSC-5710, manufactured by Shina T&C) with 0.4 wt % of a dye NEC-594 onto a polyethylene terephthalate (PET) film (thickness: 80 μm, product name: TA044, manufactured by Toyobo Co., Ltd.) to a thickness of 20 μm, followed by UV curing, and transmitting light from the PET film to a direction of the coating layer.

Detailed specifications of the dyes used in Examples are shown in Table 2. In Table 2, a maximum absorption wavelength and light transmittance at a wavelength of 590 nm were evaluated in the same manner as in FIG. 2.

TABLE 2

| | Based | Copper inclusion | Maximum absorption wavelength (nm) | Light transmittance at a wavelength of 590 nm (%) |
|---|---|---|---|---|
| Dye NEC-594 | Tetraazaporphyrin | Copper not included | 590 | 13 |
| Dye NEC-597 | Tetraazaporphyrin | Copper included | 590 | 15 |

Each module for a liquid crystal display was prepared using the polarizing plates of Examples and Comparative Examples, respectively.

Preparation Example 1: Preparation of a Composite Optical Sheet

A composition including 35 wt % of epoxy acrylate, 15 wt % of a urethane acrylate oligomer, 36 wt % of ortho-phenyl phenol ethoxylated acrylate, 10 wt % of trimethylolpropane 9-ethoxylated acrylate, and 4 wt % of a photoinitiator was prepared. The composition was coated onto one surface of a PET film (T910E, thickness: 125 μm, Mitsubishi Co., Ltd.) to form a coating layer. A prism pattern (triangular cross-section, height: 12 μm, width: 24 μm, vertex angle: 90°) was transferred from a pattern roll having an embossed pattern corresponding to the prism pattern to the coating layer, followed by curing to form a first optical sheet having a first prism pattern formed thereon. The composition was coated onto one surface of a PET film (T910E, thickness: 125 μm, Mitsubishi Co., Ltd.) to form a coating layer. A prism pattern (triangular cross-section, height: 12 μm, width: 24 μm, vertex angle: 90°, aspect ratio: 0.5) was transferred from a pattern roll having an embossed pattern corresponding to the prism pattern to the coating layer, followed by curing to form a second optical sheet having a second prism pattern formed thereon. A composite optical sheet was prepared by stacking the second optical sheet on the first optical sheet such that a longitudinal direction of the first prism pattern was orthogonal to a longitudinal direction of the second prism pattern.

Preparation Example 2: Preparation of a Light Source Side Polarizing Plate

A polarizer was prepared by stretching a polyvinyl alcohol film at 60° C. to 3 times an initial length thereof and adsorbing iodine to the stretched film, followed by stretching the resulting film to 2.5 times the stretched length of the film in an aqueous solution of boric acid at 40° C.

A PET film (Toyobo Co., Ltd., thickness: 80 μm) was bonded to a light incident surface of the polarizer and a COP film (ZEON Corporation) was bonded to a light exit surface of the polarizer by a bonding agent for a polarizing plate (Z-200, Nippon Goshei Co., Ltd.) to prepare a viewer side polarizing plate.

Preparation Example 3: Preparation of a Liquid Crystal Display Module

The composite optical sheet of Preparation Example 1, the light source side polarizing plate of Preparation Example 2, a liquid crystal panel (PVA mode), and each of the polarizing plates of Examples and Comparative Examples as a viewer side polarizing plate were sequentially assembled to prepare a liquid crystal display module. In each of the polarizing plate of Examples and Comparative Examples, the contrast ratio enhancing layer was disposed on a light exit surface of the polarizer.

Table 3 shows a schematic configuration of the above prepared liquid crystal display module. Following properties were evaluated with respect to the liquid crystal display module prepared in Examples and Comparative Examples, and the results are shown in Table 3 below.

(1) Brightness and relative brightness: An LED light source, a light guide plate, and a liquid crystal display module were assembled to prepare a liquid crystal display device including an edge type LED light source at one side thereof (having the same configuration as Samsung LED TV (55 inch, UN55KS8000F)) except for the configuration of the liquid crystal display modules prepared in Examples and Comparative Example. Brightness was measured in a white mode and a black mode at a front face (0°, 0°) of a spherical coordinate system using EZCONTRAST X88RC (EZXL-176R-F422A4, ELDIM). Relative brightness was calculated by {(brightness of Example, Comparative Example or Reference Example)/(brightness of Reference Example 1)}× 100.

(2) Contrast ratio and Relative contrast ratio: A liquid crystal display was prepared in the same manner as in (1), and a contrast ratio was measured at a front face (0°, 0°) and a lateral face (0°, 60°) in a spherical coordinate system using an EZCONTRAST X88RC (EZXL-176R-F422A4, ELDIM). Relative contrast ratio was calculated by {(contrast ratio of Example, Comparative Example or Reference Example)/(contrast ratio of Reference Example 1)}×100.

(3) Reflectance: Each of the polarizing plates prepared in Examples and Comparative Examples was adhered to a liquid crystal panel, respectively. At this time, the PET film as the first protective layer of the polarizing plate was disposed at the top from the liquid crystal panel. Reflectance was measured using a simple color difference meter (CM-2600d, Konica Minolta Co., Ltd.) without powering on the liquid crystal panel.

TABLE 3

| | | Example 1 | Example 2 | Example 3 | Example 4 | Comparative Example 1 | Comparative Example 2 | Reference Example 1 | Reference Example 2 | Reference Example 3 |
|---|---|---|---|---|---|---|---|---|---|---|
| Refractive index of first resin layer | | 1.59 | 1.59 | 1.59 | 1.59 | 1.59 | 1.59 | — | 1.59 | 1.59 |
| Refractive index of second resin layer | | 1.48 | 1.48 | 1.48 | 1.48 | 1.48 | 1.48 | — | 1.48 | 1.48 |
| Dye* (wt %) | NEC-594 | 0.1 | 0.2 | — | — | — | — | — | 0.01 | 1 |
| | NEC-597 | — | — | 0.1 | 0.2 | — | — | — | — | — |
| Pigment** (wt %) | CIM400 | — | — | — | — | — | 0.2 | — | — | — |
| Front brightness (nit) | White mode | 469.1 | 453.1 | 461.7 | 450.8 | 512.0 | 431.2 | 534.4 | 481 | 379.3 |
| | Black mode | 0.086 | 0.084 | 0.087 | 0.086 | 0.103 | 0.115 | 0.085 | 0.098 | 0.085 |
| Front relative brightness (%) | White mode | 88 | 85 | 86 | 84 | 96 | 81 | 100 | 90 | 71 |
| | Black mode | 101 | 99 | 102 | 101 | 121 | 135 | 100 | 115 | 100 |
| Contrast ratio | (0°, 0°) | 5454.7 | 5394.0 | 5306.9 | 5241.9 | 4970.9 | 3749.6 | 6287.1 | 4908.2 | 4462.3 |
| | (0°, 60°) | 436.0 | 432.1 | 439.3 | 441.0 | 409.7 | 317.5 | 289.4 | 411.5 | 446 |
| Relative contrast ratio (%) | (0°, 0°) | 87 | 86 | 84 | 83 | 79 | 60 | 100 | 78 | 71 |
| | (0°, 60°) | 151 | 149 | 152 | 152 | 142 | 109 | 100 | 142 | 154 |
| Reflectance (%) | | 2.0 | 2.0 | 1.8 | 1.7 | 2.4 | 1.8 | 2.1 | 2.2 | 1.6 |

*content of a dye in the first resin layer
**content of a pigment in the first resin layer As shown in Table 3, the polarizing plate according to embodiments of the invention includes the patterned portion and the dye to enhance lateral contrast ratio. In addition, brightness in a black mode is reduced and front contrast ratio also improves. Moreover, the polarizing plate according to embodiments of the invention reduces reflectance to be 2.0% or less so that a separate use of an antireflection film is not necessary to make a thin polarizing plate.

On the contrary, the polarizing plate of Comparative Example 1 in which a dye was not used did not show improvement of front contrast ratio and lowering of reflectance. The polarizing plate of Comparative Example 2 using a black pigment instead of a dye showed low reflectance, but front contrast ratio did not improve much.

While certain embodiments of the invention have been illustrated and described, it is understood that various modifications, changes, alterations, and equivalent embodiments can be made by those skilled in the art without departing from the spirit and scope of the invention, as defined in the following claims. It should be understood that various modifications, changes, alterations, and equivalent embodiments can be made by those skilled in the art without departing from the spirit and scope of the invention.

The invention claimed is:

1. A polarizing plate comprising:

a polarizing film; and a contrast ratio enhancing layer formed on a light exit surface of the polarizing film, wherein the contrast ratio enhancing layer comprises a first resin layer and a second resin layer, the first resin layer having a patterned portion including engraved patterns and a flat portion formed between the engraved patterns, the engraved patterns being open toward the polarizing film, the second resin layer being directly formed in contact with the patterned portion, an engraved pattern of the engraved patterns having a base angle of about 75° to about 90°, the patterned portion satisfying the following Formula 1:

$$1 < P/W \leq 10 \qquad \text{[Formula 1]}$$

wherein in Formula 1 above, P is a pitch of the patterned portion (unit: μm), and W is a maximum width of the engraved pattern (unit: μm), the first resin layer having a refractive index greater than a refractive index of the second resin layer, the first resin layer comprising a dye having a maximum absorption wavelength of about 550 nm to about 620 nm, the maximum absorption wavelength being a wavelength in which the dye exhibits a maximum absorption peak, wherein the engraved pattern comprises an optical pattern comprising a first surface formed on a top part thereof, and a wall thickness of the first resin layer from the first surface to an uppermost surface of the first resin layer is about 10 μm or less, and wherein the polarizing plate has light transmittance of about 10% to about 30% at wavelengths from 590 nm to 610 nm, and light transmittance of about 80% to about 95% at wavelengths from about 400 nm to about 500 nm and at wavelengths from about 650 nm to about 800 nm.

2. The polarizing plate of claim 1, wherein the maximum absorption wavelength of the dye is about 590 nm to about 610 nm.

3. The polarizing plate of claim 1, wherein the dye comprises a porphyrin-based dye.

4. The polarizing plate of claim 1, wherein the dye has light transmittance of about 10% to about 30% at wavelengths from about 590 nm to about 610 nm, and light transmittance of about 80% to about 95% at wavelengths from about 400 nm to about 500 nm and at wavelengths from about 650 nm to about 800 nm, the light transmittance being defined as a measurement after coating a composition prepared by mixing a (meth)acrylic resin having a refractive index of 1.57 with 0.4 wt % of the dye onto a polyethylene terephthalate (PET) film (thickness: 80 μm) to a thickness of 20 μm, followed by UV curing, and transmitting light from the PET film to a direction of the coated composition.

5. The polarizing plate of claim 1, wherein the dye is present in the first resin layer in an amount of about 0.05 wt % to about 0.5 wt %.

6. The polarizing plate of claim 1, wherein the dye is included between the engraved pattern and an adjacent engraved pattern of the engraved patterns.

7. The polarizing plate of claim 1, wherein the polarizing plate has reflectance of about 2.0% or less as measured on the first resin layer.

8. The polarizing plate of claim 1, wherein the optical pattern further comprises an inclined surface connected to the first surface, and wherein the inclined surface is a flat surface or a curved surface.

9. The polarizing plate of claim 7, wherein the first resin layer has a refractive index of about 1.50 to about 1.70.

10. The polarizing plate of claim 1, wherein the second resin layer does not comprise the dye.

11. The polarizing plate of claim 1, wherein the second resin layer is a self-adhesive layer.

12. The polarizing plate of claim 1, wherein the polarizing film, the second resin layer, and the first resin layer are sequentially stacked.

13. The polarizing plate of claim 12, wherein a protective layer is further formed on a light exit surface of the first resin layer.

14. The polarizing plate of claim 13, wherein the protective layer has an in-plane retardation Re of about 8,000 nm or more, as represented by following formula A:

$$Re=(nx-ny)\times d \qquad [\text{Formula A}]$$

wherein in Formula A above, nx and ny are refractive indices at a wavelength of 550 nm in a slow axis direction and a fast axis direction respectively, and d is a thickness of a base film (unit: nm).

15. An optical display device comprising:
a light source side polarizing plate;
a liquid crystal panel; and
a viewer side polarizing plate comprising the polarizing plate according to claim 1,
wherein the light source side polarizing plate, the liquid crystal panel, and the viewer side polarizing plate are sequentially stacked.

16. The polarizing plate of claim 1, wherein the wall thickness of the first resin layer from the first surface to the uppermost surface of the first resin layer is about 5 μm or less.

17. The polarizing plate of claim 1, wherein the wall thickness of the first resin layer from the first surface to the uppermost surface of the first resin layer is about 0 μm.

* * * * *